United States Patent [19]

Leslie

[11] 4,295,367
[45] Oct. 20, 1981

[54] SPEED INDICATING DEVICE

[76] Inventor: Wayne B. Leslie, 12347 E. Bates Cir., Aurora, Colo. 80014

[21] Appl. No.: 113,622

[22] Filed: Jan. 21, 1980

[51] Int. Cl.³ .......................................... G01C 21/10
[52] U.S. Cl. ................................. 73/184; 73/861.71
[58] Field of Search ................... 73/184, 186, 861.71, 73/861.74, 189; 116/291, 331, 332

[56] References Cited

U.S. PATENT DOCUMENTS

| 2,707,878 | 5/1955 | Cameron et al. | 73/184 |
| 2,749,751 | 6/1956 | Hastings | 73/189 |
| 3,089,335 | 5/1963 | Ebert | 73/184 |

FOREIGN PATENT DOCUMENTS 472007 2/1929 Fed. Rep. of Germany ...... 116/291

Primary Examiner—James J. Gill
Attorney, Agent, or Firm—Ancel W. Lewis, Jr.

[57] ABSTRACT

A speed indicating device disclosed includes a plate scaled with speed indicia mounted for pivotal movement about a generally vertical pivot at the front of the plate to enable the plate to aline with the direction of boat movement. A pointer is mounted for pivotal movement about a generally horizontal pivot at the rear of the plate. A drag assembly inclusive of a flexible line with a weight is suspended from the pointer causing the pointer to swing through an arc related to boat speed and the plate to aline with the direction of the boat as the weight is dragged by the boat via the water.

20 Claims, 11 Drawing Figures

U.S. Patent  Oct. 20, 1981  4,295,367
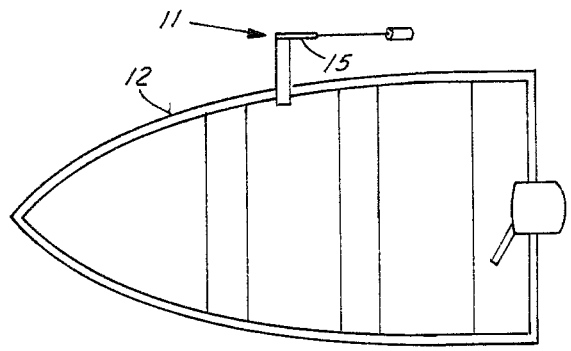
FIG. 1
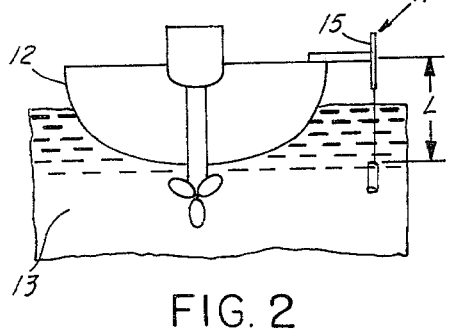
FIG. 2
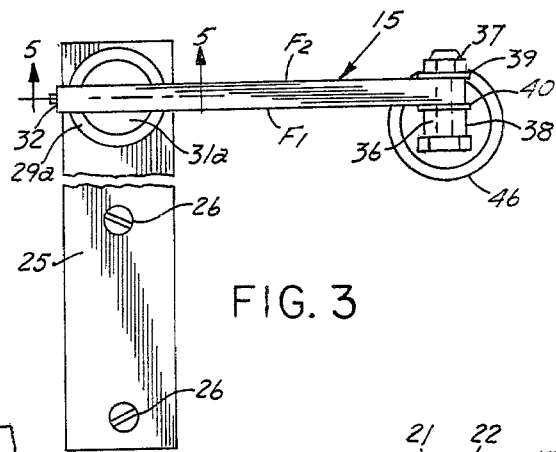
FIG. 3
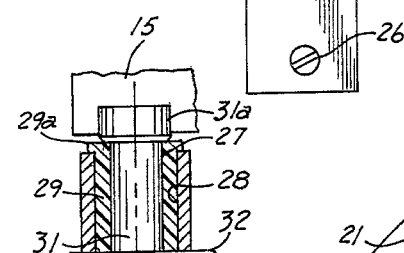
FIG. 5
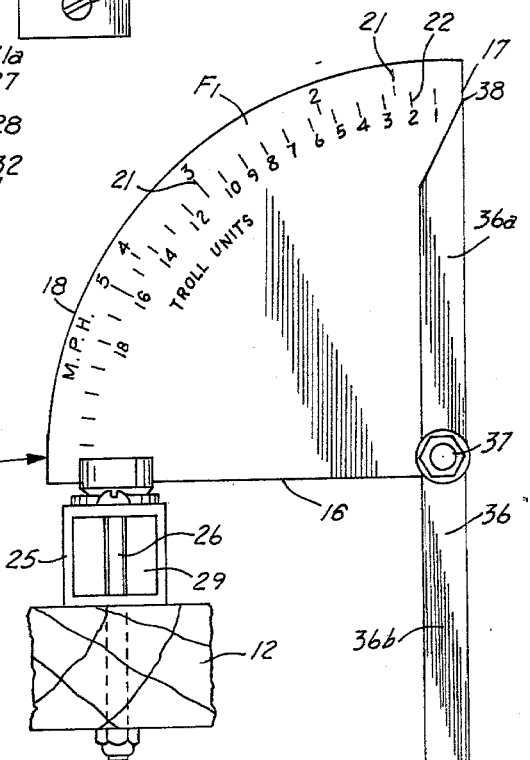
FIG. 4
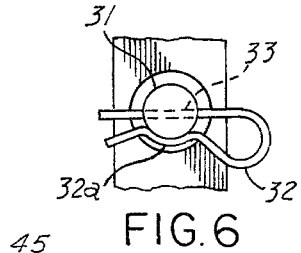
FIG. 6
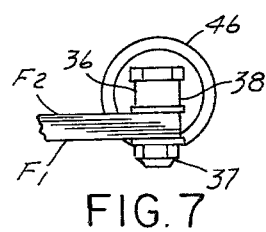
FIG. 7
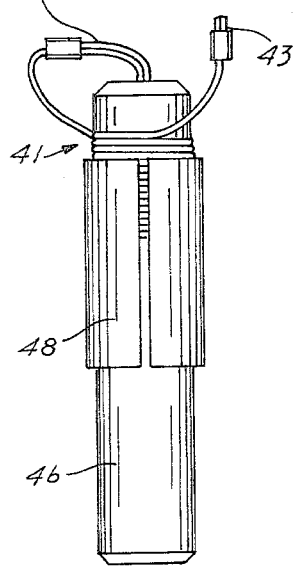
FIG. 8
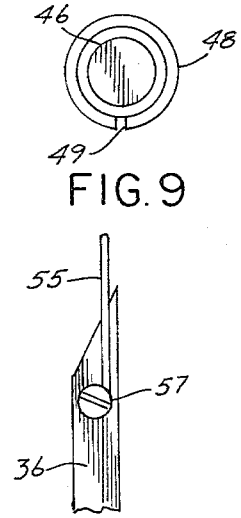
FIG. 9 / FIG. 10
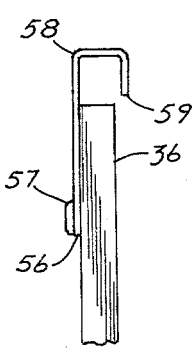
FIG. 11
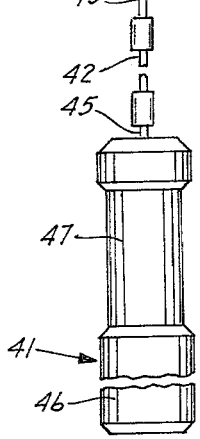

SPEED INDICATING DEVICE

TECHNICAL FIELD

This invention relates to a novel and improved speed indicating device for boats and like water craft that is particularly suited for establishing and maintaining a particular speed, especially in the lower speed ranges.

BACKGROUND ART

There is a need for speed control for boats and a specific example is during fishing by trolling, wherein it is highly desirable to be able to troll at selected substantially constant speeds. Known boat speedometers are judged by some not to have the resolution needed in the trolling speed range. Prior attempts have been made to provide speed indicating devices of the general type disclosed, as exemplified by U.S. Pat. Nos. 2,152,768, 2,707,878 and 3,871,219. There are deficiencies and disadvantages in each of these prior art devices when compared to the features of the present invention, as will be more apparent from the following description.

DISCLOSURE OF INVENTION

In accordance with the present invention there is provided a plate with scaled speed indicia mounted for pivotal movement about a generally vertical pivot at the front of the plate. The plate is demountable at the vertical pivot. A pointer is mounted to pivot relative to the rear of the plate about a generally horizontal pivot so that a point at one end moves over the scale and the pointer extends down from the plate. A drag assembly including a line and weight is connected to the extended end of the pointer so that the pointer will pivot in relation to the speed of the boat as well as to aline with the direction of travel of the boat when the weight is drawn through the water. The plate is calibrated in mph and equally spaced units along a circle on opposite mirror image faces.

BRIEF DESCRIPTION OF DRAWINGS

The details of this invention will be described in connection with the accompanying drawings, in which:

FIG. 1 is a top plan view of a speed indicating device embodying features of the present invention shown mounted on the right side of a boat;

FIG. 2 is a rear end elevation view of the device shown in FIG. 1;

FIG. 3 is a top plan view of the device shown in FIGS. 1 and 2 with an intermediate portion of the mounting arm broken and removed;

FIG. 4 is a side elevation view of the device shown in FIGS. 1 and 2 as viewed from inside the boat;

FIG. 5 is a sectional view taken along lines 5—5 of FIG. 3;

FIG. 6 is a bottom plan view of the vertical pivot joint shown in FIG. 5;

FIG. 7 is a top plan view of the horizontal pivot joint adapted for a left side mounting;

FIG. 8 is a side elevation view of the weight with the cable wrapped thereon;

FIG. 9 is a bottom plan view of FIG. 8;

FIG. 10 is a side elevation view of an optional null indicator; and

FIG. 11 is an end elevation view of the null indicator shown in FIG. 10.

DETAILED DESCRIPTION

Referring now to the drawings, a speed indicating device 11 embodying features of the present invention is shown mounted on the right side of a boat 12 between the front and rear thereof. The boat 12 is shown in FIG. 2 in a body of water 13 in an operating mode. The speed indicating device 11 shown includes an upright, relatively narrow, scaled plate 15, substantially in the shape of a quadrant having a straight bottom edge 16, a straight rear edge 17, and an arcuate or curved edge 18 extending from the bottom edge to the top of the rear edge 17.

The plate 15 has similar scaled speed indicia arranged along the curved edge on opposite side faces designated F1 and F2 so that faces F1 and F2 are mirror images to accommodate having the device mounted on either the right or left side of the boat. Each face of the plate has indicia 21 for speed calibrated in approximate miles per hour and shown as reading from 0 to 5 mph in 1 mph lines and further has indicia 22 calibrated in equally spaced increments or units shown as reading from 1 to 18 and designated troll units for trolling. Face F1 is shown facing toward the boat with the right side mount (FIG. 4) and face F2 is shown facing toward the boat with the left side mount (FIG. 7).

For the mounting of the plate at the side of the boat, there is provided an elongated mounting arm 25 shown as a hollow, rectangular, rigid metal tube, together with a pair of threaded bolt fasteners 26 extending therethrough and into the side of the boat with nuts on the ends to fasten the mounting arm to the boat. It is understood that other types of known clamps and releasable fastening means may be utilized to secure the arm to the side of the boat.

The opposite end of the mounting arm has one portion of a removable joint structure shown as including a female joint portion or a socket 27 and specifically provided by a vertical generally cylindrical hole 28 in the arm that receives a generally cylindrical plastic bushing 29, preferably Nylon or Teflon, with an upper flange 29a that retains the sleeve in the arm hole 28. The plate 15 has a male joint portion 31 in the form of a generally cylindrical stud or pin projecting down from the bottom edge 16 adjacent the front end thereof. The stud is slidably received into the sleeve and forms a vertical pivot about which the plate will pivot freely during the operation, as described hereinafter. This mounting arrangement enables the plate 15 to seek out a direction to follow or aline with the course of travel of the boat. Further, this allows the plate 15 to be readily demounted from the mounting arm when not in use.

A holding key 32 is shown extending through a transverse hole 33 in the bottom end of the pin 31 to prevent the plate from being prematurely pulled from the arm during use. The key 32 is shown in FIGS. 5 and 6 as provided with a curved section 32a that lays flat and embraces an external arcuate section of the pin 31 to hold the key 32 in place.

A pointer or pointing arm 36 is pivotally mounted between its ends to the plate by a generally horizontal pivot member 37. Pivot member 37 extends through a hole adjacent the rear and bottom edges 17 and 16 of the plate 15 to provide an upper end portion 36a and a lower end portion 36b that are pivoted relative to a plate about a generally horizontal pivot. The lower end portion 36b projects beyond the bottom edge of the plate. The pointer terminates in a sharpened pointing end 38 that moves along the indicia 21 and 22 as the pointer pivots about the pivot member 37. This occurs when the weight is submerged in and moving through the water, as hereinafter described.

The pivot member 37 shown is in the form of a threaded hex-headed bolt and nut assembly and has a washer 39 against face F2 and a washer 40 between face F1 and arm 36.

The use of a threaded bolt and nut for pivot 37 enables the arm 36 and pivot 37 to be removed from the plate, turned around, and mounted on the opposite face F2 so that the arm pivots over face F2 as shown in FIG. 7, and in this way the device may then be mounted on the left-hand side of the boat as required.

A drag assembly 41 is mounted on the lower end of the pointer which includes a flexible metal cable 42 having a loop 43 formed in the upper end extending through a hole 44 in the lower end of the pointer opposite point 38 and a loop 45 in the lower end embedded in the top of a weight 46. The hole 44 shown is defined by a knife-like edge against which the upper loop 43 will freely slide. An alternative arrangement is to provide an extra loop in the form of a cable thimble with a contoured interior surface through which the upper loop 43 would extend and in turn the thimble would extend through hole 44. In this case hole 44 would not have to have a knife-like edge but could be of uniform diameter throughout.

The weight 46 is suspended a selected distance below the water so as to move through the water. This distance is measured from the horizontal pivot 37 and is designated L in the drawings. In practice, for a weight of one pound, the length of the cable L is between 5 feet and 6 feet. The weight 46 is shown as having a groove 47 to accommodate the wrapping of the cable thereon and a flexible split sleeve 48 with a longitudinal slot 49 holds the wrapped cable on the weight.

Referring now to FIGS. 10 and 11, there is shown an optional null indicator in the form of a bent wire 55 having a loop 56 in one end through which a threaded screw 57 extends and threads into the pointer 36. The wire extends up the side of the arm above the pointing end 38 and back down to provide a U-shaped section 58 that terminates in a pointing end 59. To adjust the position of the null indicator with respect to the pointer the screw 57 is loosened and rotated about screw 51 until it lines up with the zero indicia and the screw is then tightened to secure the null indicator in the correct position. This null indicator can be used to compensate for a particular irregularity in the mounting arm or clamp which results in the plate not being oriented along true vertical and horizontal planes.

OPERATION

With the device mounted on the side of the boat as shown and the weight 46 submerged in the water, the movement of the boat causes the weight to swing back in a direction opposite to the direction of travel of the boat. This is due to the resistance (inertia and hydraulic drag) in the water, causing the pointer 36 to pivot through an arc related to boat speed which is indicated on the scaled plate 15. This pull on the pointer also causes the plate to seek out and automatically aline with the course of travel of the boat, as when turns are made or when the boat is in the forward or reverse mode.

In this way the device will give an indication of the true magnitude of the speed and a true direction of the boat during movement in the water and in its operation has been found to operate independently of any wind effects. The device described herein has been found to be particularly accurate in the lower speed ranges of boats, which herein is intended to refer to speeds less than 10 mph. The speed range can be increasing the cable length and weight size. Finally, the device can be mounted on the left side of the boat, as above described.

When not in use the plate is removed by first removing the key 32 and pulling the pin 31 from the socket and the cable 42 is wrapped in the notch 47 and the sleeve 48 slid thereon to hold the cable in a wound condition.

From the foregoing description it should be appreciated that a device constructed in accordance with the present invention as above described is relatively simple, accurate, has improved resolution, and is highly versatile. The device may be sized for a variety of boats including pleasure boats to large commercial fishing boats. The device is highly effective in the primary trolling speed range of about 1 mgh to 4 mph. The device also has attachment flexibility to accommodate boats of different construction and may be readily clamped to the side of the boat.

While specific reference has been made to the use of the scale having equal increments arranged along a circle for trolling applications, it is understood that this may be used for other applications such as measuring the speed of a sailboat in the lower speed ranges.

While the present invention has been described with a certain degree of particularity, it is understood that the present disclosure has been made by way of example and that changes in details of structure may be made without departing from the spirit thereof.

What is claimed is:

1. A speed indicating device for a boat and like craft moving in a body of water comprising:
    a plate with speed indicia for indicating the speed of the boat and having a first pivot joint portion at the front of said plate;
    a mounting arm that extends laterally out from a side of the boat having a second pivot joint portion operatively associated with said first pivot joint portion for supporting said plate for pivotal movement about a generally vertical pivot to permit the plate to aline with the course of travel of the boat; and
    a combination pointing arm, flexible line, and weight supported at a rear bottom portion of said plate, said pointing arm being pivotally mounted intermediate its ends to pivot relative to said plate about a generally horizontal pivot at the rear of the plate with a pointing end moving along said speed indicia to indicate speed,
    said line being connected to the lower end of said pointing arm and said weight being connected to the lower end of said line, said weight being adapted to move through a body of water while suspended from said pointing arm whereby to pivot said pointing arm about said generally horizontal pivot in relation to the speed of the boat, said plate also being moved about said generally vertical pivot to seek out a direction to aline the plate with the course of travel of the boat as said weight is dragged via the body of water.

2. A speed indicating device as set forth in claim 1 wherein said plate is substantially in the shape of a quadrant with a substantially straight bottom edge, a substantially straight rear edge, and a curved forward edge extending from the forward end of said bottom edge of the top of said rear edge.

3. A speed indicating device as set forth in claim 2 wherein said indicia is for measure of speed and are arranged along said curved edge that is calibrated in approximate miles per hour.

4. A speed indicating device as set forth in claim 3 wherein said plate has further indicia means indicating generally spaced increments arranged along a circle.

5. A speed indicating device as set forth in claim 1 wherein said male joint portion is carried by said mounting arm to provide said generally vertical pivot.

6. A speed indicating device as set forth in claim 1 wherein said male and female joint portions are releasable from one another to provide for the ready demounting of said plate from said mounting arm.

7. A speed indicating device as set forth in claim 1 wherein said mounting arm is elongated and has one end adapted to fasten to the boat, said plate having the male joint portion projecting beyond a forward bottom edge of said plate, said mounting arm having the female joint portion which is operatively associated with said male joint portion to form said generally vertical pivot.

8. A speed indicating device as set forth in claim 1 wherein said male joint portion is in the form of a generally cylindrical pin and said female joint portion is in the form of a generally cylindrical socket.

9. A speed indicating device as set forth in claim 1 wherein said mounting arm is a rigid, hollow member of generally rectangular shape having at least one bolt-type fastener adjacent one end opposite said plate extending through the arm into a portion of the boat.

10. A speed indicating device as set forth in claim 1 wherein said pointing arm terminates in a point at one end arranged to move along and aline with said indicia and has a portion opposite the point that extends beyond the plate.

11. A speed indicating device as set forth in claim 10 including a null pointer pivotally mounted on said upper portion arranged to be selection positioned at a zero indicia when the boat is in an at-rest position.

12. A speed indicating device as set forth in claim 1 wherein said pointing arms includes a lower portion extending beyond a bottom edge of said plate and having an aperture in the lower end adapted to receive one end portion of said line.

13. A speed indicating device as set forth in claim 12 wherein said line has a loop at one end looped through a hole in an end portion of said pointing arm to swing freely relative thereto.

14. A speed indicating device as set forth in claim 13 wherein said hole in said pointer is defined by a knife-like edge.

15. A speed indicating device as set forth in claim 13 wherein said line has a second loop at the opposite end embedded in said weight.

16. A speed indicating device as set forth in claim 1 wherein said line is a metal cable.

17. A speed indicating device as set forth in claim 1 wherein said weight has an external notch upon which said line may be wrapped, together with a flexible split sleeve slidable over said weight adapted to hold said line in a wrapped condition.

18. A speed indicating device as set forth in claim 1 wherein said plate has opposite faces that are mirror images, each with similar indicia, and said horizontal pivot is provided by a pivot member that is removable to enable said pointing arm to be mounted on either face of said plate for alternate left and right side mountings of said device on a boat.

19. A speed indicating device for a boat and like water craft moving through a body of water comprising:
a plate substantially in the shape of a quadrant, said plate having speed indicia arranged along an upper curved edge of said plate and calibrated in approximate miles per hour and having miles per hour indicia for indicating the speed of the boat and having a male joint portion at the front of said plate;
a mounting arm having an inner end portion adapted to fasten to the side of the boat and an outer end portion arranged for externally laterally out from the inner end portion, said outer end portion having a female joint portion interfitting with said male joint portion for supporting said plate upright and for pivotal movement about a generally vertical pivot to permit the plate to aline with the course of travel of the boat, said male and female joint portions being releasable from one another to provide for the ready demounting of said plate from said mounting arm; and
a combination pointer, flexible line, and weight supported at a rear bottom portion of said plate to move about a generally horizontal pivot spaced from and disposed rearwardly of said vertical pivot,
said line having one end connected to the lower end of said pointer, said weight being connected to the other end of said line and adapted to move through a body of water while suspended from said pointer whereby to pivot said pointer about said horizontal pivot in relation to the speed of the boat, said plate moving about said vertical pivot so as to seek out a direction to automatically aline said plate with the course of travel of the boat as the weight is dragged via the body of water.

20. A speed indicating device for a boat and like water craft moving through a body of water comprising:
an upright plate substantially in the shape of a quadrant with a bottom edge, a rear edge and a curved edge extending from the front of the bottom edge to the top of the rear edge, said plate having opposite faces that are mirror images each with indicia for speed arranged along said curved edge and calibrated in approximate miles per hour, said faces having further indicia calibrated in equally spaced increments along a circle for different types of fishing lures, said plate having a male joint portion at the front thereof;
an elongated mounting arm having one end portion fastened to the side of the boat and the other end extending laterally out from the one end portion with the other end portion carrying a female pivotal joint portion interfitting with said male joint portion for supporting said plate for pivotal movement relative to the boat about a vertical pivot to permit the plate to aline with the course of travel of the boat, said male and female joint portions being releasable from one another to provide for the ready demounting of said plate from said mounting arm and boat; and
a combination elongated pointer, flexible cable, and weight supported at a rear bottom portion of said plate, said pointer being pivotally mounted intermediate its ends to pivot relative to said plate about a horizontal pivot disposed rearwardly of said vertical pivot, said cable having one end connected to the lower end of said pointer and said weight on the other end of said cable being adapted to move through a body of water while suspended from said pointer whereby to pivot said pointer about said horizontal pivot in relation to the speed of the boat with said plate moving about said first pivot so as to seek out a direction and to automatically aline the plate with the course of boat travel as the weight is dragged via the body of water.

* * * * *